(No Model.)
E. A. THIEM.
ADJUSTABLE WHEEL GAGE.
No. 563,944. Patented July 14, 1896.
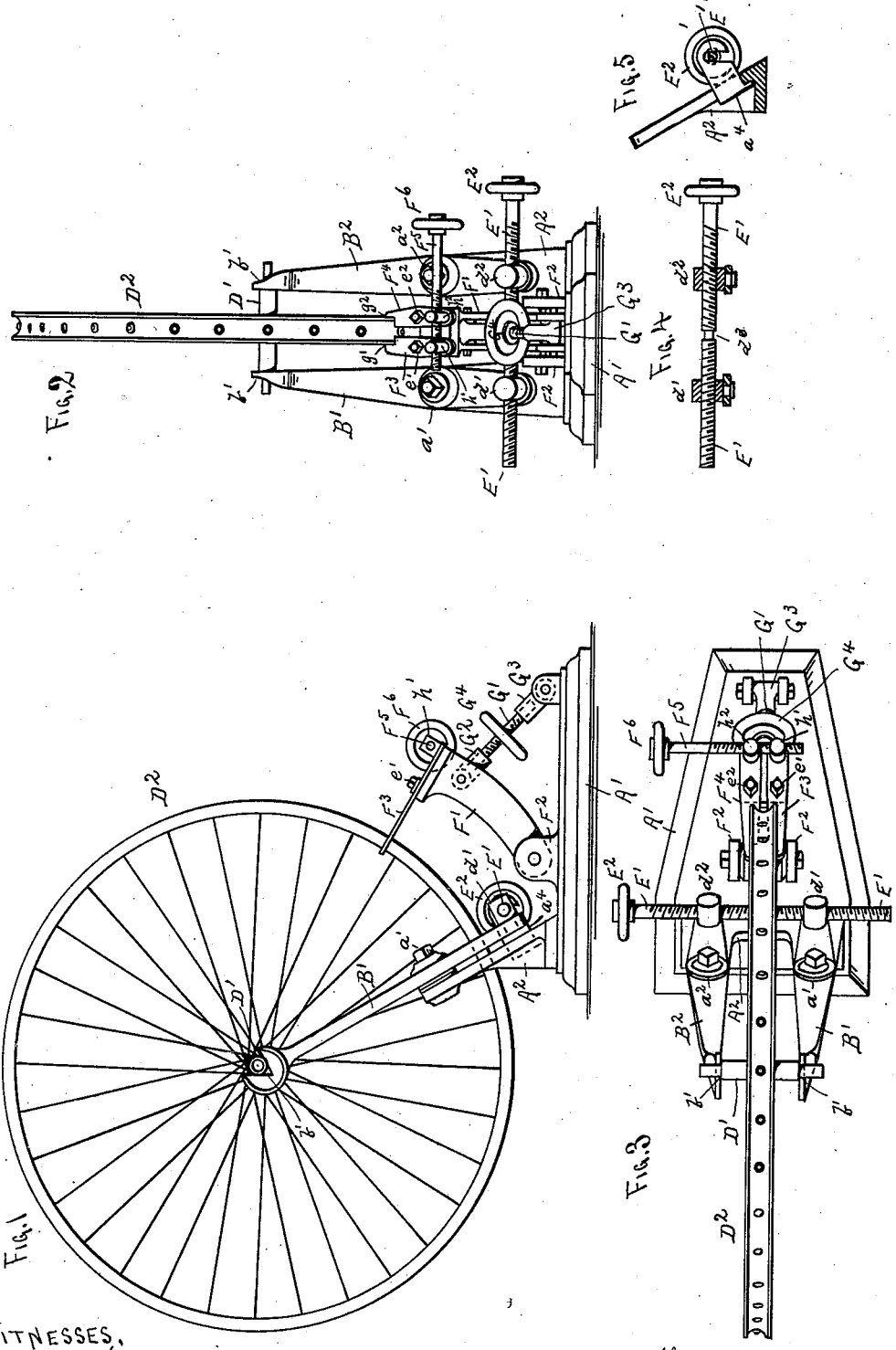
WITNESSES,
W. R. Smith
R. B. Benson
Edward A. Thiem, INVENTOR
By Charles N. Woodward, Atty.

UNITED STATES PATENT OFFICE.

EDWARD A. THIEM, OF ST. PAUL, MINNESOTA.

ADJUSTABLE WHEEL-GAGE.

SPECIFICATION forming part of Letters Patent No. 563,944, dated July 14, 1896.

Application filed October 28, 1895. Serial No. 567,119. (No model.)

*To all whom it may concern:*

Be it known that I, EDWARD A. THIEM, a citizen of the United States, residing at St. Paul, in the county of Ramsey and State of Minnesota, have invented certain new and useful Improvements in Wheel-Gages, of which the following is a specification.

My invention relates to gages for bicycle and other wheels, by means of which it can be readily ascertained whether or not the rim of the wheel is perfectly true; and it consists in the novel construction and combination of parts hereinafter fully described and claimed.

In the drawings, Figure 1 is a side elevation, Fig. 2 is a front elevation, and Fig. 3 is a plan view, of the apparatus complete. Fig. 4 is a side view of one of the adjusting screw-rods detached. Fig. 5 is a sectional detail illustrating the manner of mounting the adjusting screw-rod.

This apparatus may be employed to adjust different forms of wheels, but is more particularly applicable to bicycle-wheels, and for the purpose of illustration I have shown it in the drawings so employed.

A' represents the base, to which a standard $A^2$ is secured and extending upward and backward at an angle, and having two levers B' $B^2$ pivoted at $a'$ $a^2$ at their upper ends, as shown. In the upper ends of the levers B' $B^2$ V-shaped cavities or recesses $b'$ are formed to form rests to support the ends of the axle D' of the wheel $D^2$, as shown, the V shape of the recesses insuring the reception of any sized axle. Upon the lower ends of the levers B' $B^2$ are swiveled two nuts $d'$ $d^2$, through which a screw-rod E' is tapped, the thread passing through, the nut $d'$ being reversed from that passing through the nut $d^2$, so that as the screw-rod is turned by its hand-wheel $E^2$ the lower ends of the levers B' $B^2$ will be moved toward or away from each other to increase or decrease the distance apart of the upper ends having the axle-rests, so that the levers may readily be adjusted to the length of the axle. At the center the screw-rod E' will be formed with a channel $d^3$, adapted to fit loosely into a slot in a bracket $a^4$, the latter attached to the base of the standard $A^2$, to hold the screw-rod from end movement, but leaving it free to be turned, or to move up and down to the slight extent required by the movement of the levers B' $B^2$.

F' is a standard pivoted in lugs $F^2$ on the base A', and having two arms $F^3$ $F^4$, pivoted at $e'$ $e^2$ to its top, the outer ends of the arms having notches $g'$ $g^2$, adapted to fit against the rim of the wheel $D^2$. Upon the other ends of the arms $F^3$ $F^4$ are swiveled nuts $h'$ $h^2$, through which a screw-rod $F^5$ is tapped by right and left hand threads, similar to the screw-rod E', so that by turning the hand-wheel $F^6$ the notches $g'$ $g^2$ may be adjusted to fit any width of tire.

G' is a right and left hand screw-rod tapped by its upper end into a nut $G^2$, swiveled into the standard F', and the lower end tapped into a similar nut $G^3$, pivotally connected to the base A', the turning of the screw-rod by its hand-wheel $G^4$ causing the bracket F' to be moved upward or downward to adjust the notches $g'$ $g^2$ nearer to or farther away from the rim of the wheel, to adapt the apparatus to different-sized wheels.

By this simple apparatus a wheel may be set by its axle upon the levers B' $B^2$ and the latter adjusted to support the wheel centrally, and then the arms $F^3$ $F^4$ adjusted until the notches $g'$ $g^2$ rest against the corners of the rim. Then by revolving the wheel upon the rests $b'$ $b^2$ the position of the rim at different points will denote its rotundity.

If the rim runs truly between the ends of the arms $F^3$ $F^4$ at all parts of its periphery, the operator knows it is perfectly true, but if not, then the points requiring adjustment will be readily and quickly noted.

The adjustments can be made with great certainty and nicety, and at the same time very quickly and with no chance for error.

Having thus described my invention, what I claim as new is—

1. In a wheel-gage, the combination with the base and the standard, of the levers pivoted to said standard intermediate their ends, and their upper ends formed with V-shaped notches, and means, substantially as described, connected with the lower ends thereof for contracting and expanding the same.

2. The combination with the base, the standard at one end thereof, and the levers pivoted to said standard intermediate the ends and having V-shaped notches in their upper ends, of the right and left hand screw-rod passing through corresponding recesses in the lower ends of said levers, substantially as described.

3. In a wheel-gage, the combination with the base, the standard at one end thereof, the levers pivoted thereto intermediate their ends, and having V-shaped notches in their upper ends, and the right-and-left screw-rod passing through corresponding apertures in the lower ends of said levers, of the bracket secured to said base, the levers pivoted to said bracket and having notches in one end adapted to engage with the rim of a wheel, means for simultaneously contracting or expanding said levers and means for moving said bracket to and from the rim of a wheel, substantially as described.

4. In a wheel-gage, the combination with the base, the standard, the levers pivoted to said standard intermediate their ends and having notches in their upper ends and the right-and-left screw-rod passing through corresponding apertures in the lower ends of said levers for simultaneously contracting or expanding the same, of the bracket pivoted to said base, the levers pivoted to the upper end thereof having notches adapted to engage with the rim of a wheel, the right-and-left screw-rod passing through corresponding apertures in the lower ends of said lever, the nuts pivotally connected, respectively, with said base and bracket and the right-and-left screw-rod connected with said nuts, substantially as described.

5. In a wheel-adjusting apparatus, a wheel supported from a standard and base, two levers having notches fitting the corners and face of the rim of the wheel, and pivoted upon a standard or bracket, said bracket being movably mounted upon said base, a nut swiveled to said bracket, a nut swiveled to said base, and a screw-rod having right and left hand threads and fitting by its ends into said nuts, whereby said bracket may be adjusted, substantially as and for the purpose set forth.

In testimony whereof I have hereunto set my hand in the presence of two subscribing witnesses.

EDWARD A. THIEM.

Witnesses:
JEAN McDIARMID,
H. S. WEBSTER.